United States Patent [19]

Brittain et al.

[11] 4,444,797

[45] Apr. 24, 1984

[54] HEAT TREATMENT OF PARTICULATE SOLID MATERIALS

[75] Inventors: John E. Brittain, Beaconsfield; Graham S. Cattell, Lingfield, both of England

[73] Assignee: Societe d'Assistance Technique pour Produits Nestle S.A., Lausanne

[21] Appl. No.: 234,377

[22] Filed: Feb. 13, 1981

[30] Foreign Application Priority Data

Feb. 15, 1980 [GB] United Kingdom ................. 8005182

[51] Int. Cl.³ ........................... A23B 4/00; A23L 3/18
[52] U.S. Cl. ..................................... 426/399; 426/402; 426/509; 426/523
[58] Field of Search ............... 366/144, 167, 220, 235; 426/478, 495, 523, 589, 509, 399, 519, 402, 510, 511; 99/348, 516, 584, 277.2, 287

[56] References Cited

U.S. PATENT DOCUMENTS

| | | | |
|---|---|---|---|
| 2,631,628 | 3/1953 | McK. Martin | 99/584 X |
| 3,971,851 | 7/1976 | Otto | 426/519 X |
| 3,993,791 | 11/1976 | Breed et al. | 426/478 |
| 4,059,919 | 11/1977 | Green | 426/509 X |
| 4,103,605 | 8/1978 | Hemborg et al. | 99/348 X |

FOREIGN PATENT DOCUMENTS 1445942  8/1976  United Kingdom .

*Primary Examiner*—Billy J. Wilhite
*Assistant Examiner*—Christine A. Peterson
*Attorney, Agent, or Firm*—Vogt & O'Donnell

[57] ABSTRACT

In a batch method for the heat treatment of particulate solid material, especially food materials, the vessel in which the heat treatment takes place is essentially a jacketed pressure vessel (1) in which the material is tumbled while being heated, and in order to obtain an increase in throughput the solids and cooking liquor are removed to a second vessel (2) after cooling. In the second tumbling vessel there is a reversible strainer (12) which is used in the position illustrated to separate the liquor from the solids and then inverted after withdrawal of the liquor so that they may be blended with a different liquor, such as a sauce, introduced via a line (14).

5 Claims, 1 Drawing Figure

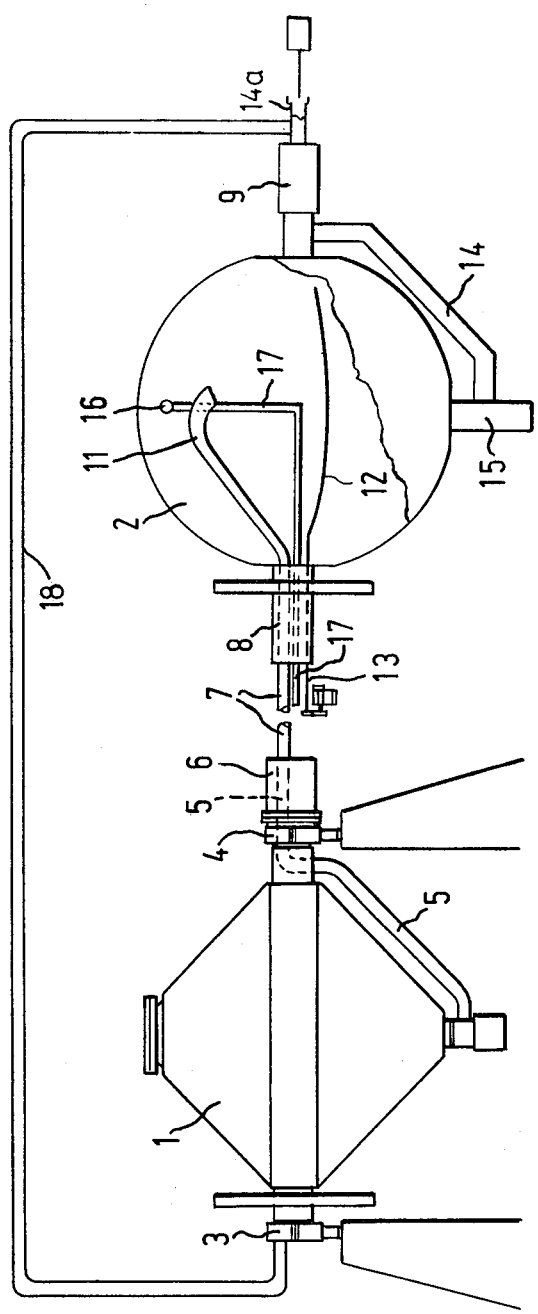

HEAT TREATMENT OF PARTICULATE SOLID MATERIALS

This invention relates to the heat treatment of particulate solid materials, especially food materials which are to be cooked and sterilized and maintained in sterile condition prior to packaging.

United Kingdom Patent Specification No. 1,445,942 describes a batch process of heat treating solid food materials, primarily by condensation of live steam, in which the treatment is carried out in a rotary vessel adapted to give a tumbling action to the materials as they are heated. It is also advantageous to add a lubricant liquid, hot and under pressure, to the materials in the vessel part way through the heating process to reduce damage to the materials under treatment.

After completion of the heat treatment it is frequently desirable to separate at least some of the liquid from the solid phase which is then blended with a sauce or the like to produce the final product for packaging, normally canning.

The use of a single vessel for all stages of the processing is the simplest approach and is successful in many instances. However, it has now been discovered that, somewhat surprisingly, this is not always the most economically viable system. If output is to be increased, it has in some cases been found that duplication of the multipurpose vessel is more expensive and less effective than making fuller use of separate vessels for different stages of the process.

In accordance with the invention there is provided a batch method for the heat treatment of particulate solid food material, in which a batch of particulate solid material is heated in a rotary heat treatment vessel while the vessel is being rotated to impart a tumbling action to the particles of solid material, the heating being carried out at least partially while the vessel contains substantial quantities of liquid, transferring the solids and liquid to a second rotary vessel, separating the solid and liquid phases in the said second vessel and removing the liquid phase, introducing a different liquid to the second vessel and rotating the second vessel to tumble the solids and different liquid to blend them together.

The vessel in which the cooking, i.e. heating and sterilizing takes place has a jacket, and is robust enough to withstand the operating pressure involved in maintaining aqueous liquids at sterilizing temperatures without boiling. The second vessel may be of simpler construction and there is no need to provide a jacket for a vessel in which the steps of separating and mixing take place. It is preferred that the cooling of the batch take place in the heat treatment vessel.

Preferably, the solid and liquid phases are separated in the second vessel by means of a reversible strainer.

The invention will be further described with reference to the accompanying drawing, of which the single FIGURE is a diagrammatic illustration of a form of plant for carrying out the invention.

The single FIGURE of drawing shows a heat treatment vessel 1 and a separating and blending vessel 2 for carrying out separate stages of a process of heat treatment of successive batches of particulate solid material, particularly food material, which is to be cooked and sterilized in the vessel 1 and then transferred to the vessel 2 for separation from the cooking liquor and addition of and blending with a sterile sauce. It will be appreciated that sterility will be obtained during the heat treatment phase and is maintained through the subsequent stages of the treatment right up to packaging after discharge from the vessel 2.

The vessel 1 is preferably substantially of the type described in United Kingdom Patent Specification No. 1,445,942, and in the simultaneously published United Kingdom Specification No. 1,445,941. The vessel 1 is rotatable about hollow trunnions 3 and 4 and is so shaped that the contents of the vessel are tumbled by such rotation. Heating takes place primarily by the injection of live steam which condenses in the vessel 2 while the latter rotates, the steam being introduced by a line (not shown) passing through the hollow trunnion 3. As is described in United Kingdom Specification No. 1,575,069, hot water may also be injected under pressure during this heating so as to provide additional lubrication for the solid particles, which are thereby protected from damage as they soften during the heat treatment.

The process is more fully described in the specifications already referred to and the contents thereof are to be regarded as imported herein by reference.

After completion of the heat treatment stages, the solid and liquid phases are transferred via a discharge line 5, which is connected through a suitable gland 6, to an inlet line 7 of the vessel 2. The vessel 2 is also mounted on hollow trunnions 8 and 9 for rotation about a substantially horizontal axis, and it will be seen that the inlet line 7 passes through the hollow trunnion 8 and connects with a pipe 11 which has a bell mouth and opens into the upper part of the vessel 2. The vessel 2 also houses a reversible strainer 12 which is connected to a shaft 13 passing through the hollow trunnion 8. The hollow trunnion 9 is connected to a supply and discharge line 14 connected to a supply and discharge connection 15, and the external connection of the line 14 is indicated at 14a. The drawing also shows a spray ball 16 and a connecting pipe 17 which also passes through the hollow trunnion 8 for supply of cleaning and/or sterilizing fluids to the interior of the vessel.

In operation, the heat treatment is carried out in the vessel 1 and after completion of the heat treatment phases, the solids and liquids are discharged from the vessel 1 via the line 5 and passed via the line 7 and pipe 11 into the vessel 2. The solids are trapped by the strainer 12 whereas the liquids pass therethrough and are drawn off via the discharge connection 15 and the discharge line 14.

A sterile sauce, or other second liquid to be mixed with the solids is then introduced via the line 14 and connection 15 whilst the strainer 12 is reversed so as to allow the solids to be mixed with the newly introduced liquid. The vessel is then rotated about its hollow trunnions 8 to blend the solids and liquid together and the blended product is withdrawn through the connection 15 and line 14. The interior of the vessel and associated piping can then be cleaned.

During this separation and blending, the vessel 1 is being prepared and used for a further heating cycle. The separated liquid may be returned via line 18 for further use in the vessel 1 as the lubricant liquid.

We claim:

1. A batch method for the heat sterilization treatment of particulate solid food materials, in which a batch of particulate solid material is heated in a rotary heat treatment vessel while the vessel is being rotated to impart a tumbling action to the particles of solid material, the heating being carried out at least partially while the vessel contains substantial quantities of liquid, transferring the solids and liquid under aseptic conditions to a second rotary vessel, separating the solid and liquid phases in the said second vessel and removing the liquid phase, introducing a different liquid to the second vessel and rotating the second vessel to tumble the solids and different liquid to blend them together.

2. A batch method as claimed in claim 1, in which after heating, the solid material is cooled in the heat treatment vessel.

3. A batch method for the heat sterilization treatment of particulate solid food materials, in which a batch of particulate solid material is heated in a rotary heat treatment vessel while the vessel is being rotated to impart a tumbling action to the particles of solid material, the heating being carried out at least partially while the vessel contains substantial quantities of liquid, transferring the solids and liquid under aseptic conditions to a second rotary vessel, separating the solid and liquid phases in the said second vessel and removing the liquid phase, introducing a different liquid to the second vessel, rotating the second vessel to tumble the solids and different liquid to blend them together, and discharging the blend of solids and second liquid from the second vessel under aseptic conditions and then packaging the solids and liquid blend under aseptic conditions.

4. A batch method for the heat sterilization treatment of particulate solid food materials, in which a batch of particulate solid material is heated in a rotary heat treatment vessel while the vessel is being rotated to impart a tumbling action to the particles of solid material, the heating being carried out at least partially while the vessel contains substantial quantities of liquid, transferring the solids and liquid under aseptic conditions to a second rotary vessel, separating the solid and liquid phases in the said second vessel and removing the liquid phase, introducing a different liquid to the second vessel, rotating the second vessel to tumble the solids and different liquid to blend them together, and introducing a second batch of particulate solid material in the rotary heat treatment vessel to be heated at the same time that the separation and blending steps are being carried out on the first batch of material in the second vessel.

5. The method of claim 4, wherein the liquid phase removed from the second vessel is introduced in the rotary heat treatment vessel with the second batch of particulate solid material.

* * * * *